Patented May 3, 1932

1,856,620

UNITED STATES PATENT OFFICE

WALTER G. CHRISTIANSEN, OF BLOOMFIELD, NEW JERSEY, ASSIGNOR TO E. R. SQUIBB & SONS, OF NEW YORK, N. Y., A CORPORATION OF NEW YORK

MOLECULAR COMPOUNDS OF AMIDO-PYRIN WITH ETHYL ISOPROPYL BARBITURIC ACID

No Drawing. Application filed May 19, 1928. Serial No. 279,218.

My invention relates to analgeso-hypnotic compositions and particularly to molecular compounds resulting from the reaction of amidopyrin, i. e. 1-phenyl-2.3-dimethyl-4-dimethylamino-5-pyrazolon, with ethylisopropylbarbituric acid.

Such compounds have been found to perform better than mechanical mixtures of their individual components the dual function of analgesic and hypnotic, exercising a soporific action even when the subject is in pain.

In the practice of my invention, amidopyrin is commingled with ethylisopropylbarbituric acid, and the mixture is fused and maintained for a short while above the melting point. In order to obtain a superior product, it is desirable that the mixture before fusion be uniform. This condition is attained preferably by mixing the ingredients in solution—that is to say, either dissolving each separately and combining the solutions, or dissolving both in a common solvent—and then evaporating to dryness.

As a specific example, 53.85 grams of amidopyrin and 46.15 grams of ethylisopropylbarbituric acid, to produce a compound in which the components are present in equimolecular proportion, or 70 grams of amidopyrin and 30 grams of ethylisopropylbarbituric acid, to produce a compound in which the components are present in the proportion of two molecules of the former to one of the latter, are dissolved in 200 cc. of acetone; the solvent is expelled by evaporation, and the residue is melted and heated at about 98° C. for fifteen minutes. On cooling, there results a yellow mass, which may be powdered.

It will be understood that other solvents, for instance ether, may be used instead of acetone, and that various other changes, within the scope of the appended claims, may be made without departing from the invention or sacrificing any of the advantages thereof.

I claim:

1. As new products, yellow molecular compounds of amidopyrin and ethylisopropylbarbituric acid, in the proportion of one or two molecules of the former to one of the latter.

2. As a new product, a yellow molecular compound of amidopyrin and ethylisopropylbarbituric acid in equimolecular proportion.

3. As a new product, a yellow molecular compound of amidopyrin and ethylisopropylbarbituric acid in the proportion of two molecules of the former to one of the latter.

In testimony whereof I affix my signature.

WALTER G. CHRISTIANSEN.